United States Patent [19]
Wood

[11] 3,892,870
[45] July 1, 1975

[54] ARTIFICIAL FRUIT AND PROCESS THEREFOR

[75] Inventor: Francis William Wood, Bedford, England

[73] Assignee: Lever Brothers Company, New York, N.Y.

[22] Filed: Apr. 23, 1973

[21] Appl. No.: 353,275

[52] U.S. Cl. ............... 426/573; 426/575; 426/576; 426/577; 426/578
[51] Int. Cl. ............................................... A23l 1/04
[58] Field of Search .......... 426/168, 289, 350, 167, 426/169, 170

[56] References Cited
UNITED STATES PATENTS

| | | | |
|---|---|---|---|
| 2,821,479 | 1/1958 | Forkner | 426/350 |
| 3,362,831 | 1/1968 | Szczesniak | 426/169 |
| 3,615,645 | 10/1971 | Forkner | 426/170 |
| 3,676,158 | 7/1972 | Fischer | 426/350 |

FOREIGN PATENTS OR APPLICATIONS

| | | | |
|---|---|---|---|
| 883,976 | 12/1961 | United Kingdom | 426/167 |

*Primary Examiner*—A. Louis Monacell
*Assistant Examiner*—J. M. Hunter
*Attorney, Agent, or Firm*—Arnold Grant

[57] ABSTRACT

An artificial fruit having a gelled matrix of calcium alginate or calcium low methoxyl pectate having dispersed therein gelled particles based on a second gelling agent.

8 Claims, No Drawings

ARTIFICIAL FRUIT AND PROCESS THEREFOR

This invention relates to food products; and in particular, it is concerned with providing certain new products having a heterogeneous eating texture.

For the purposes of this specification the difference between a heterogeneous texture and a homogeneous one can be broadly illustrated with reference to oranges and apples. The flesh of an apple has a homogeneous texture, whereas that of an orange if heterogeneous: when a segment of orange is bitten into, the structure within the segment walls is sensed as non-uniform, as the teeth alternately encounter the walls of the juice sacs and the juice enclosed by them.

The invention provides a heterogeneous texture by making use of different gelling agents i.e., substances capable of forming gels with water.

The food product of the invention comprises a matrix of a gel based on a first gelling agent having dispersed therein corpuscles of a gel based on a second gelling agent. By 'corpuscles' we mean relatively small bodies such as particles, beads or droplets, preferably of diameter 0.5 to 3 mm.

The food product of the invention is thus a heterogeneous gel. When it is bitten into the teeth alternately come into contact with the corpuscles of gel and the portions of gel matrix separating the corpuscles from one another; being based on different gelling agents, the corpuscles and the matrix enclosing them have a different texture.

Preferably, the gel matrix is of the kind which can be formed by gelling a solution of the first gelling agent with specific cations which react with it, as for example an alginate sol or a low methoxy pectate sol can be gelled by calcium or aluminium ions. The corpuscles dispersed in the matrix may then be based on a gelling agent (the 'second gelling agent') which is not sensitive to the specific cations employed, for example carageenan, gelatine, furcellaran, starch or agar. As second gelling agent the use of agar is preferred, and as first gelling agent we prefer the use of an alginate.

The texture of the products can be controlled by varying the volume ratio dispersed corpuscles: enclosing gel matrix. If it is desired to imitate fairly closely the texture of a citrus fruit, the ratio is preferably from 1:1 to 3:1.

The gel strength of the gel from which the gel corpuscles are formed (as measured on a Bloom gelometer) is suitably in the range 50 – 200. When an agar gel is used the concentration of agar in the gel particles is preferably 0.5 – 2 percent by weight. Other gelling agents are suitably used in the following concentrations:

| | | |
|---|---|---|
| Carageenan | 0.2 | – 2% |
| Furcellaran | 1 | – 2% |
| Gelatine | 2 | – 10% |
| Starch | 5 | – 10% |

When the matrix is formed by an alginate gel, the gel is preferably made by gelling a sol of sodium alginate of high molecular weight (of the order of 100,000). An alginate having a low content of mannuronic acid residues (mannuronic:guluronic ratio substantially less than 1:1) is specially suitable. When the preferred high molecular weight low mannuronic sodium alginate is used, its concentration in the alginate sol that is made to gel is suitably from 1.5 – 5 percent by weight.

If the products of the invention are made so that the osmotic pressure in the corpuscles is higher than that in the matrix, the degree of heterogeneity in texture that one senses on eating them is enhanced. The required differential osmotic pressure can be simply achieved by ensuring a higher concentration of water-soluble low molecular weight materials (low relative to the molecular weight of the gelling agent) in the corpuscles than in the matrix. With a dessert product, and particularly one intended to simulate a fruit, it is convenient to employ a relatively high concentration of a sugar (eg sucrose, glucose, fructose) in the corpuscles. A fruit flavour, for example a citrus fruit flavour, can be included in the product, either in the corpuscles or in the matrix. So also can a fruit pulp or puree, for example a pulp of citrus fruit or a relatively bland pulp of a fruit having a uniform texture such as apple, pear or peach.

When the product is to be frozen, it is desirable to include a freeze-thaw stabilising agent such as a cooked starch or a cellulose ether in the matrix.

The food product of the invention can be prepared by a process in which particles of a gel based on the second gelling agent are dispersed in a solution containing the first gelling agent, and the solution is then gelled around the particles. The term solution here includes a sol such as an alginate or low methoxy pectate sol. When the solution of the first gelling agent is to be gelled by specific di-of higher-valent cations, it is preferred that at least part of the cations used should be incorporated in the gel particles based on the second gelling agent. When the gel particles are dispersed in a solution of the first gelling agent, the cations that then diffuse from the particles into the solution bring about gelling of the solution. The gel formed at the interface then tends to be somewhat harder than that more distant from the particles, and this difference contributes to the desired heterogeneity of the total structure. Preferably, gelling of the solution (sol) of the first gelling agent is brought about by calcium ions. To incorporate calcium ions in the gel particles based on the second gelling agent, an edible calcium salt such as calcium lactate, citrate, gluconate, tartrate or acetate may be employed as ion-source, together with an edible acid such as citric, malic, lactic or fumaric acid to solubilise the salt if the latter is ordinarily insoluble or of only low solubility. When calcium ions are incorporated in the gel particles and the gel particles are dispersed in the cell, an enveloping skin of calcium gel such as calcium alginate forms rapidly at the interface of the gel particles and the sol. This skin quickly thickens and becomes impenetrable by the sol, but remains permeable to the calcium ions of the gel particles, and these ions diffuse throughout the sol to gel it to form a firm matrix, for example of calcium alginate.

Food products according to the invention in which the gel matrix is a calcium alginate gel or low methoxy pectate gel can also be prepared by mixing a solution of a calcium salt with an alginate or low methoxy pectate sol simultaneously with or subsequent to the dispersion of the gel particles in the sol. To avoid the alginate or pectate gelling too rapidly, precautions are taken to release calcium ions in a controlled manner, by including a calcium-chelating compound such as trisodium citrate in the system. The solution of calcium salt may be mixed with the alginate or pectate sol at the same time as the gel particles are dispersed in the sol, and this procedure may be combined with that (already described) of including calcium ions in the gel particles themselves. All the above procedures are operated so that no substantial gelation of the alginate or pectate sol takes place until mixing of the sol with calcium ions has been completed and the mixture has reached a substantially shear free condition.

The procedure by which the gel particles are dispersed in the solution of the first gelling agent may also serve to form those particles in the desired size, as illustrated in Example 3 later. A form of apparatus which is suitable for both comminution and dispersion is an in-line mixer having a low volume, and a low residence time.

The moulds in which gelation of the alginate sol takes place under shear-free conditions may be continuous moulds passing on a conveyor system under the mixer outlet, and pieces of product of a desired size can be obtained by cutting at right angles to the length of the mould; or rectangular moulds can be used to form a block of gel from which pieces can be cut by shaped cutters. Alternatively, small individual moulds having a shape similar to that of natural fruit or natural fruit segments can be used.

Those products of the invention which have a gel matrix based on the preferred calcium alginate of low mannuronic content can be pasteurised, for example by heating at 100°C for 5 minutes, without losing their structure, for a matrix of calcium alginate is stable to heat. Although the gel corpuscles dispersed in the matrix may be of a gel that is heat-reversible, the product as a whole remains stable on heating, for the corpuscles melt but do not run out of the calcium alginate matrix.

The invention is further illustrated by the following examples.

EXAMPLE I 0.8 g agar and 45 g sugar were dissolved in 100 ml of water at 90° – 100°C. The solution was allowed to cool to about 60°C, and 0.4 gm calcium lactate and 0.2 gm citric acidk together with 0.2 gm of a mixture of orange flavouring and colouring agents were added. The resulting mixture was allowed to cool to room temperature to form a firm gel. This gel was finely chopped into gel particles of average size 1 – 2 mm.

A sodium alginate sol incorporating flavouring and colouring agents was prepared from the following ingredients:

| | | |
|---|---|---|
| Sodium alginate | 0.5 | gm |
| Sugar | 1.0 | gm |
| Orange flavouring and colouring agents | 0.2 | gm |
| Water | 50 | ml |

The gel particles were stirred with the alginate sol until they were uniformly dispersed in it, and the mixture was then allowed to stand in a shear-free condition. The calcium ions incorporated in the agar gel diffused into the alginate sol to form a matrix of calcium alginate gel, which appeared to be set after about 15 minutes. The gel was allowed to harden for 2 hours. The resulting product consisted of fruit flavoured corpuscles of agar gel distributed in a matrix of fruit flavoured alginate gel, and pieces cut from the product have a texture similar to that of the interior of a segment of natural orange.

EXAMPLE 2

1 gm agar and 45 gm sugar were dissolved in water at 90° – 100°C. The solution was cooled to about 60°C, and 0.2 gm dicalcium phosphate and 0.6 gm citric acid were added to the solution together with 0.2 gm orange flavouring and colouring agents. The resulting mixture was allowed to cool to room temperature to form a firm gel. This gel was finely chopped to form gel particles of average size 1 – 2 mm.

50 ml of a flavoured sodium alginate sol were prepared as described in Example 1. The agar gel particles were stirred into the alginate sol, and the mixture was allowed to stand undisturbed, to form a product similar to that of Example 1.

EXAMPLE 3

10 litres of water were heated to 90°C and 100 gm of agar and 4.5 kg of sugar were added with stirring. This mixture was rapidly brought to the boil to ensure complete solution of the agar, and was then allowed to cool to about 60°C. A calcium ion-release agent incorporating colouring and flavouring thus:

| | | |
|---|---|---|
| Dicalcium phosphate | 8.25 | gm |
| Trisodium citrate dihydrate | 24.8 | gm |
| Citric acid monohydrate | 24.8 | gm |
| Beta carotene | 2.0 | gm |
| Mandarin orange flavouring agent | 20.0 | gm | was then stirred in, and the resulting mixture was allowed to cool to room temperature to form a firm gel.

A sodium alginate sol incorporating flavouring and colouring was then prepared from the following ingredients:

| | | |
|---|---|---|
| Sodium alginate | 150 | gm |
| Mandarin orange flavouring agent | 10 | gm |
| Beta-carotene | 1.0 | gm |
| Water | 4.5 | litres |

The alginate sol was charged into one of a pair of reservoirs feeding a continuous in-line mixer (Oakes 4M) beneath whose discharge outlet a moving belt was situated. All the agar gel was roughly chopped into cubes of 1 cm side and was charged into the other reservoir, together with the following calcium ion-containing composition:

| | | |
|---|---|---|
| Dicalcium phosphate | 2.75 | gm |
| Trisodium citrate dihydrate | 8.2 | gm |
| Citric acid monohydrate | 8.2 | gm |
| Water | 500 | gm |

The agar and alginate mixtures were pumped from the reservoirs to the mixer at rates of 90 kg per hour and 45 kg per hour respectively. From the discharge outlet of the mixer there issued a flexible strip of product which was deposited onto the moving belt. The product consisted of fine pieces of fruit-flavoured agar gel dispersed in a matrix of fruit-flavoured partially gelled alginate sol. Gelation of the sol continued under the influence of the calcium ions present in the shear-free system as the product was borne along on the belt. With formation of a calcium alginate gel matrix complete, the product was pasteurised on the belt by steam heating at 100°C for 5 minutes, and after cooling it was cut into segments. The product had a texture similar to that of the interior of a segment of natural mandarin orange.

What is claimed is:

1. A process for the production of artificial fruit of heterogeneous eating texture consisting essentially of the steps of
   i. preparing a fruit-flavored solution of a first gelling agent selected from the class consisting of alginate and low methoxy pectate;
   ii. dispersing fruit-flavored particles having a diameter of from about 0.5 mm to about 3 mm of a gel based on a second gelling agent selected from the class consisting of agar, carageenan, gelatin, furcellaran and starch in the solution; and
   iii. gelling the solution round the particles by action of calcium ions, the volume ratio of the particles to the solution being from about 1:1 to about 3:1.

2. A process for the production of artificial fruit of heterogeneous eating texture according to claim 1 in which an edible soluble calcium salt is incorporated in the gel particles based on the second gelling agent so that when the gel particles are dispersed in the solution of the first gelling agent calcium ions diffuse into and gel said solution.

3. A process for the production of artificial fruit of heterogeneous eating texture according to claim 1 in which the first gelling agent is alginate.

4. A process for the production of artificial fruit of heterogeneous eating texture according to claim 1 in which the second gelling agent is agar.

5. A process for the production of artificial fruit of heterogeneous eating texture according to claim 2 in which the solution of the first gelling agent is mixed with a solution of a calcium salt simultaneously with or subsequent to the dispersion in the solution of the fruit-flavored particles of the gel based on the second gelling agent.

6. A process for the production of artificial fruit of heterogeneous eating texture according to claim 1 in which the solution of the first gelling agent and the gel particles based on the second gelling agent are fruit-flavored by the incorporation of fruit pulp or puree.

7. A process for the production of artificial fruit of heterogeneous eating texture according to claim 1 in which the particles based on the second gelling agent contain a higher concentration of sugar than the concentration of sugar in the solution of the first gelling agent so that the particles based on the second gelling agent have a higher osmotic pressure than the gelled solution of the first gelling agent.

8. An artificial fruit with heterogeneous eating texture consisting essentially of fruit-flavored particles of diameter about 0.5 mm to about 3 mm of a gel based on a gelling agent selected from the class consisting of agar, carageenan, gelatin, furcellaran and starch, said particles being dispersed in a fruit-flavored calcium alginate or calcium low methoxy pectate gel, the volume ratio of the particles to the calcium alginate or calcium low methoxy pectate gel being from about 1:1 to about 3:1.

* * * * *

UNITED STATES PATENT OFFICE
CERTIFICATE OF CORRECTION

PATENT NO. : 3,892,870
DATED : July 1, 1975
INVENTOR(S) : Francis William Wood

It is certified that error appears in the above-identified patent and that said Letters Patent are hereby corrected as shown below:

Column 1, line 8, after "Appl. No. 353,275", add the following:

--Claims priority - application Great Britain, May 11, 1972, 22137/72--.

Signed and Sealed this eighteenth Day of November 1975

[SEAL]

Attest:

RUTH C. MASON
Attesting Officer

C. MARSHALL DANN
Commissioner of Patents and Trademarks